(12) United States Patent
Powell et al.

(10) Patent No.: US 10,680,502 B2
(45) Date of Patent: Jun. 9, 2020

(54) MAGNETICALLY GEARED APPARATUS AND A POLE PIECE FOR SUCH APPARATUS

(71) Applicant: MAGNOMATICS LIMITED, Sheffield (GB)

(72) Inventors: David James Powell, Sheffield (GB); Petr Chmelicek, Brno (CZ)

(73) Assignee: MAGNOMATICS LIMITED (GB)

(*) Notice: Subject to any disclaimer, the term of this patent is extended or adjusted under 35 U.S.C. 154(b) by 84 days.

(21) Appl. No.: 15/754,568

(22) PCT Filed: Aug. 23, 2016

(86) PCT No.: PCT/GB2016/052617
§ 371 (c)(1),
(2) Date: Feb. 22, 2018

(87) PCT Pub. No.: WO2017/033001
PCT Pub. Date: Mar. 2, 2017

(65) Prior Publication Data
US 2018/0269770 A1    Sep. 20, 2018

(30) Foreign Application Priority Data
Aug. 24, 2015  (GB) .................................. 1514992.5

(51) Int. Cl.
*H02K 49/10*    (2006.01)
*H02K 1/24*    (2006.01)
*H02K 16/02*    (2006.01)

(52) U.S. Cl.
CPC ........... *H02K 49/102* (2013.01); *H02K 1/246* (2013.01); *H02K 16/02* (2013.01)

(58) Field of Classification Search
CPC .. H02K 1/00; H02K 1/06; H02K 1/08; H02K 1/14; H02K 1/146; H02K 1/18;
(Continued)

(56) References Cited

U.S. PATENT DOCUMENTS 5,053,666 A    10/1991  Kliman
2006/0290225 A1    12/2006  Mipo et al.
(Continued)

FOREIGN PATENT DOCUMENTS

CN    1852001 A    10/2006
CN    101589537 A    11/2009
(Continued)

OTHER PUBLICATIONS

International Search Report and the Written Opinion of the International Searching Authority, or the Declaration dated Nov. 7, 2016 (12 pages).
(Continued)

*Primary Examiner* — Tran N Nguyen
(74) *Attorney, Agent, or Firm* — Dorsey & Whitney LLP

(57) ABSTRACT

A magnetically geared apparatus (400), a pole piece component (420) and a plurality of pole pieces (422) for such apparatus are disclosed. The magnetically geared apparatus (400) comprises the pole piece component (420) and the pole piece component (420) comprises the plurality of pole pieces (422) mounted to a carrier (421), wherein at least one of the pole pieces (500) comprises at least two axially-spaced portions spaced apart by a portion of a higher magnetic reluctance (560) than that of each of the two axially-spaced portions.

15 Claims, 8 Drawing Sheets

(58) Field of Classification Search
CPC ... H02K 1/22; H02K 1/24; H02K 1/246; H02K 1/27; H02K 1/276; H02K 1/28; H02K 1/30; H02K 16/00; H02K 16/02; H02K 49/10; H02K 49/102
See application file for complete search history.

(56) References Cited

U.S. PATENT DOCUMENTS

| | | | |
|---|---|---|---|
| 2013/0119789 A1* | 5/2013 | Maekawa | H02K 19/24 310/46 |
| 2016/0065007 A1 | 3/2016 | Sumi | |

FOREIGN PATENT DOCUMENTS

| | | |
|---|---|---|
| CN | 202696294 U | 1/2013 |
| CN | 102969812 A | 3/2013 |
| EP | 2110933 A1 | 10/2009 |
| JP | 2010017030 | 1/2010 |
| JP | 2015095974 A | 5/2015 |
| WO | 2001046968 A1 | 6/2001 |
| WO | 2009138725 A2 | 11/2009 |
| WO | 2017033001 A1 | 3/2017 |

OTHER PUBLICATIONS

GB Search Report regarding application No. GB1514992.5 dated Jul. 8, 2016 (2 pages).

\* cited by examiner

MAGNETICALLY GEARED APPARATUS AND A POLE PIECE FOR SUCH APPARATUS

CROSS-REFERENCE TO RELATED APPLICATIONS

The present application is a U.S. National Stage entry under 35 U.S.C. § 371 of International Application No. PCT/GB2016/052617, with an international filing date of Aug. 23, 2016, and which claims the benefit of GB1514992.5, filed Aug. 24, 2015, each of which is hereby incorporated by reference herein, in their entireties and for all purposes.

FIELD

This disclosure relates to magnetically geared apparatus, a pole piece rotor and a pole piece for such apparatus.

BACKGROUND

While the vast majority of gearing solutions have used mechanical gearing arrangements, there is increasing interest in and demand for smaller, more lightweight, more efficient and less expensive gearing solutions that offer the high-torque transmission of existing mechanical arrangements. Magnetic gearing arrangements are an example of such a solution.

A magnetic gear uses magnetic fields to transmit torque without mechanical contact. In one form, a magnetic gear has three principle components, all three of which may rotate relative to each other. In one existing arrangement a radially inner one of the three components generates a first magnetic field with a first number of pole pairs. A radially outer one of the three components generates a second magnetic field with a second number of pole pairs. A radially intermediate one of the three components does not generate its own magnetic field. Instead, it has a number of ferromagnetic pole pieces supported by a non-magnetic and non-conductive structure. This third component acts as a passive part of a magnetic circuit between the first and second components. The role of the pole pieces is to modulate the first and second magnetic fields such that they interact in a geared manner. Consequently, torque can be transmitted between any two of the three components in a geared manner, or between all three of them in a manner similar to an epicyclic mechanical gear arrangement.

Other forms of magnetically geared apparatus comprise a passive gear with two permanent magnet arrays and a modulating ring; a motor generator with a stator wrapped around a magnetic gear; a motor generator with an integrated gear with a rotating permanent magnet rotor, a rotating modulating rotor, and a static array of magnets and windings; a variable magnetic gear with three rotors, two with permanent magnet arrays and a modulating rotor, and a stator winding to control the rotation of one of the rotors; and/or a variable magnetic gear with one permanent magnet rotor, a modulating rotor, and a stator winding which can couple with the modulated field and control rotational speed and therefore gear ratio.

An example of a magnetic gear is shown in FIG. 1. In this case, the outer component is additionally provided with a set of windings to become—in effect—a motor-generator. This arrangement combines the functionality of a magnetic gear and a typical electrical machine by allowing for geared torque transmission in combination with operation in either motoring or generating modes. In this case, the first and second magnetic fields are generated by permanent magnets on the inner and outer components. When the windings of the outer component are supplied with a three phase, 120 degree displaced current, a rotating magnetic field is set up in the machine. This rotating magnetic field has the same number of pole pairs as the first magnetic field generated by the inner component. The rotating magnetic field and the first magnetic field directly couple such that the harmonic of the first magnetic field can be used for electromechanical energy conversion.

The magnetic flux associated with the parts of the magnetic fields in the machine that interact and contribute to the transmission of torque is termed the 'useful' magnetic flux. However, not all of the flux is useful. Some of the magnetic flux does not contribute to the transmission of torque and instead propagates in a direction perpendicular to that of the useful magnetic flux. This is termed the 'stray' magnetic flux.

In order to accommodate the radially intermediate component, the magnetic gear must have an air gap between the other two components of the machine. Because this air gap must accommodate the intermediate component, it is much larger than the air gap between the two components of a conventional electrical machine. This arrangement can lead to high levels of stray magnetic flux in the air gap. This creates two key problems: first, a proportion of the magnetic field set up in the machine is wasted as it is not being used to transmit torque; and second, the stray magnetic field induces eddy currents in the pole pieces in addition to those induced by the useful magnetic flux. Both of these problems are sources of inefficiency in the machine. While all electrical machines can suffer from these problems, those based on magnetic gear technology are particularly vulnerable as the problems are exaggerated by the size of the air gap and the high frequency of the magnetic fields employed.

Eddy currents are undesirable for a number of reasons. First, eddy currents induce a 'secondary' magnetic field which opposes the 'primary' magnetic field that created it. The resultant field (that is, the sum of the primary and secondary magnetic fields) is weaker than the primary magnetic field. In the case where the primary magnetic field is the useful magnetic field, this reduces the efficiency of the machine. Second, the eddy currents have a heating effect in the pole pieces due to resistive losses. Undesirably, this is a form of energy loss in the machine. The additional heating can also damage the mechanical properties of the pole piece support structure and of other materials in the machine and undesirably can cause the temperature in other parts of the machine to increase. The overall decrease in efficiency of the machine caused by eddy currents manifests itself either as a decrease in torque at the output shaft, or an increase in drag torque at the drive shaft.

These problems can be addressed in part by manufacturing the pole pieces from stacks of thin magnetically conductive sheets, or laminations, which are electrically insulated from each other. An example of such a laminated pole piece is shown in FIG. 2. The laminations act to restrict the flow of the eddy currents induced by the useful magnetic flux. The laminations are orientated such that the laminations lie parallel with the lines of useful magnetic flux. This orientation is adopted since the eddy currents induced by the useful magnetic flux are a greater source of loss in the machine than the eddy currents induced by the stray magnetic flux. Laminating the pole pieces in this way does not however restrict the flow of eddy currents induced by the stray magnetic flux. The eddy currents induced by the stray magnetic flux continue to circulate within the planes of the individual laminations, as shown in FIG. 3. As a result, the flow of eddy currents induced by the stray magnetic flux remains a source of loss in the machine.

Alternative solutions for at least restricting the flow of eddy currents include manufacturing the pole pieces from sintered or composite soft magnetic materials. However this can be problematic as this can significantly reduce the mechanical strength of the pole pieces.

Accordingly, it is an object of at least some of embodiments of this invention to address these problems.

SUMMARY

According to one aspect, there is provided magnetically geared apparatus comprising a pole piece component, the pole piece component comprising: a plurality of pole pieces mounted to a carrier, at least one of the pole pieces comprising at least two axially-spaced portions spaced apart by a portion of a higher magnetic reluctance than that of each of the two axially-spaced portions.

The portion of higher magnetic reluctance may be a portion comprising a material of higher magnetic reluctance.

One or more of the axially-spaced portions may comprise a plurality of axially-stacked laminations of ferromagnetic material. The laminations may be substantially electrically insulated from each other. This may be by a layer of insolent on interfacing faces of adjacent laminations. The at least two axially-spaced portions may be spaced apart by more than the thickness of the electrically insulating layer between adjacent laminations.

The portion of higher magnetic reluctance may comprise no laminations.

One or more of the axially-spaced portions may be formed of soft magnetic composite material.

The portion of higher magnetic reluctance may comprise no soft magnetic composite material.

One of the axially-spaced portions may comprise the stack of laminations. The other of the at least two axially-stacked portions may be formed of soft magnetic composite material.

There may be more than two axially-spaced portions, spaced apart by portions of higher magnetic reluctance. Any of the axially-spaced portions may comprise a stack of laminations; any of the portions may be formed of soft magnetic composite material. The portions of higher magnetic reluctance may comprise no laminations and no soft magnetic composite material.

The or each portion of higher magnetic reluctance may be positioned adjacent axial locations in the pole piece that otherwise would experience the highest axial magnetic flux.

The or each portion of higher magnetic reluctance may be positioned closer to an axial end of the pole piece than to an axial midpoint of the pole piece.

In an embodiment, there may be five axially-spaced portions, an axially central portion of greatest axial length, two axially intermediate portions at either axial end thereof of lesser length, and two axially outer portions each at a respective outer axial end of the intermediate portions, the axially outer portions of least length.

The axial length of the or each portion of higher reluctance may be shorter than that of any of the axially-spaced portions. The axial length of each portion of higher magnetic reluctance may be the same.

The or each portion of higher reluctance may be an air gap. It may be a portion substantially filled by a solid material of higher reluctance, for example a substantially non-magnetic, non-conductive material, for example a glass composite.

The or each pole piece may be substantially shorter than the axial length of magnetic-field-generating components of the magnetic gear. One effect of this is to reduce the density of the stray magnetic flux over the length of the pole piece.

The periphery of at least one of the axially-stacked laminations in the plane of the lamination comprises at least one concave portion.

One or more of the laminations in the stack of laminations may have at least one slit therein.

The length of the or each slit may be substantially less than the radial height of the lamination in which the slit extends.

The width of the or each slit may be less than the axial thickness of the lamination.

There may be at least two slits; the lengths of any two of the slits may be different.

The widths of any two of the slits may be different.

One or more slit may extend from a radial outer edge of the lamination.

One or more slit may extend from a substantially radially-extending edge of the lamination.

Any two of the one or more slits may extend from different edges of the lamination.

According to another aspect, there is provided magnetically geared apparatus comprising a pole piece component, the pole piece component comprising: a plurality of pole pieces mounted to a carrier, at least one of the pole pieces comprising a plurality of axially-stacked laminations, wherein the periphery of at least one of the axially-stacked laminations in the plane of the lamination comprises at least one concave portion.

The pole piece may be formed of the plurality of axially-stacked laminations.

The pole piece may be formed substantially entirely of the plurality of axially-stacked laminations.

Part of the pole piece may be formed of the plurality of axially-stacked laminations.

Part of the pole piece may be formed of soft magnetic composite material.

All of the pole pieces may be formed as the at least one pole piece.

The concave portion may be arranged to reduce ohmic losses in the lamination.

The length by which the concave portion projects from the periphery of the cross section may be greater than the width of the concave portion. The width may be the width of the concave portion. The width may be the width of the concave portion at its widest point.

The shape of the at least one lamination may be a concave polygon.

The length of the or each concave portion in a radial direction may be substantially less than the dimension of the respective lamination in the radial direction.

The length of the or each concave portion may be less than one third of the dimension of the respective lamination in a radial direction.

The width of the or each concave portion may be less than the axial thickness of the lamination.

There may be at least two concave portions in the at least one lamination; the lengths of any two of the concave portions may be different.

The widths of any two of the concave portions may be different.

One or more concave portions may extend from a substantially circumferentially-extending edge of the lamination.

One or more concave portions may extend in a direction substantially perpendicular to a substantially circumferentially-extending edge of the lamination.

One or more concave portions may extend from a substantially radially-extending edge of the lamination.

One or more concave portions may extend in a direction substantially perpendicular to a radially-extending edge of the lamination.

Any two of the one or more concave portions may extend from different edges of the lamination.

Any two of the one or more concave portions may extend in different directions in the plane of the lamination.

The or each concave portion may be substantially a rectangle.

The or each concave portion may be a slit.

The at least one of the laminations in the stack may have a first concave portion which extends from the mid-point of the radially inner edge of the lamination, and a second concave portion which extends from the mid-point of the outer edge of the lamination.

The at least one of the laminations in the stack may have three concave portions which extend from the radially inner edges of the lamination, and three concave portions which extend from the radially outer edges of the lamination. The concave portions may be equally spaced along each of the radially inner and outer edges of the lamination.

According to another aspect, there is provided magnetically geared apparatus comprising a pole piece component, the pole piece component comprising: a plurality of pole pieces mounted to a carrier, at least one of the pole pieces comprising a plurality of axially-stacked laminations, wherein at least one of the laminations in the stack has at least one aperture therethough.

The pole piece may be formed of the plurality of axially-stacked laminations.

Part of the pole piece may be formed of the plurality of axially-stacked laminations.

Part of the pole piece may be formed of soft magnetic composite material.

All of the pole pieces may be formed substantially as the at least one pole piece.

The aperture may be arranged to reduce ohmic losses in the lamination.

The or each aperture may be closer to the periphery of the at least one lamination than to the middle of the at least one lamination.

The length and width of the or each aperture may be substantially less than the dimension of the lamination in a radial direction.

The length and width of the or each aperture may be less than one third of the dimension of the lamination in a radial direction.

The length and width of the or each aperture may be less than the axial thickness of the lamination.

The or each aperture may be substantially closer to a radially outer edge of the at least one lamination than to the middle of the lamination.

The or each aperture may extend in a direction substantially perpendicular to a radial outer edge of the lamination.

The or each aperture may be closer to a radially-extending edge of the at least one lamination than to the middle of the lamination.

The or each aperture may extend in a direction substantially perpendicular to a radially-extending edge of the lamination.

There may be at least two apertures; the dimensions of any two of the apertures may be different.

Any two of the one or more apertures may extend from different edges of the lamination.

Any two of the one or more apertures may extend in different directions in the plane of the lamination.

The or each aperture may be any of a slit, slot or rectangle.

According to another aspect, there is provided one or more pole pieces as defined above.

The or each pole piece may be formed of ferromagnetic material.

The or each pole piece may be formed of non-magnetised material.

The or each pole piece may not be in direct contact with a winding. The or each pole piece may not have a respective set of coils wound therearound.

The or each pole piece may not independently set up its own magnetic field.

The or each pole piece may not be a solenoid or at least part of a solenoid.

The or each pole piece may not be a permanent magnet.

Optional features of any aspect may also be, it is envisaged, optional features of any other aspect unless there is a clear technical incompatibility preventing this.

The magnetically geared apparatus of any aspect may comprise at least two additional components in additional to the pole piece component.

One of the additional components may be a radially inner component, positioned radially inside the pole piece component. The radially inner component may comprise a plurality of permanent magnets; it may comprise electromagnets. The radially inner component may be mounted for rotation relative to the pole piece component.

One of the additional components may be a radially outer component, positioned radially outside the pole piece component. The radially outer component may comprise permanent magnets; it may comprise electromagnets; it may comprise permanent magnets and electromagnets.

The radially inner component may set up a first magnetic field. The radially outer component may set up a second magnetic field.

The pole piece component may be arranged to cause the two fields to interact by comprising n pole pieces, where n is the sum of the pole pairs of the inner component and the outer component.

According to another aspect, there is provided magnetically geared apparatus comprising a pole piece component, the pole piece component comprising: a plurality of pole pieces mounted to a carrier, at least one of the pole pieces comprising a plurality of axially-stacked laminations, the laminations substantially electrically insulated from each other by the laminations in each pair of juxtaposed laminations being insulated from each other by a respective layer of insulating material, at least one of the layers being at least 10 micrometres in thickness.

Each of the layers may be at least 10 micrometres in thickness.

The or each layer may be at least 15 micrometres in thickness.

Conventionally laminations are separated by an insulation layer of 2 to 5 micrometres in thickness. Increasing the insulation by two, three or more times in this way applies the principles described herein to such an arrangement.

The magnetically geared apparatus of any aspect may comprise: a passive magnetic gear, optionally with two permanent magnet arrays and a modulating ring; a motor generator, optionally with a stator wrapped around a magnetic gear; a motor generator, optionally with an integrated gear with a rotating permanent magnet rotor, a rotating modulating rotor and a static array of magnets and windings; a variable magnetic gear, optionally with three rotors, two with permanent magnet arrays and a modulating rotor, and a stator winding to control the rotation of one of the rotors; and/or a variable magnetic gear, optionally with one permanent magnet rotor, a modulating rotor, and a stator winding which can couple with the modulated field and control rotational speed and therefore gear ratio.

BRIEF DESCRIPTION OF THE DRAWINGS

Specific embodiments in which the invention is embodied are described below by way of example only and with reference to the accompanying drawings, in which:

FIG. 5b is a side view of the pole piece of FIG. 5a;

DETAILED DESCRIPTION OF THE DRAWINGS

Figure 4:
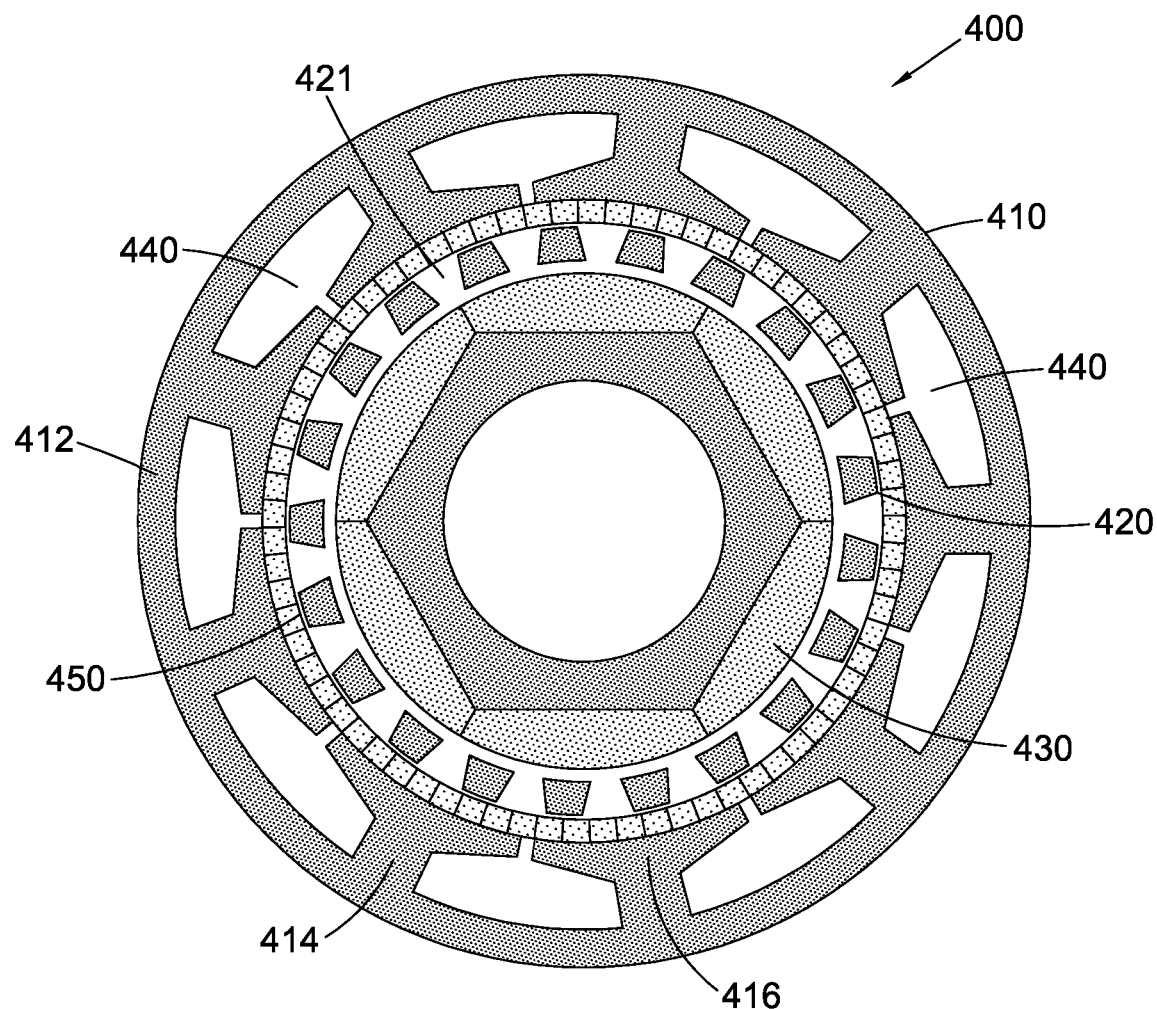
FIG. 4 is an axial view of components of a magnetically geared radial field machine that is a first embodiment.

FIG. 4 shows a magnetically geared radial field machine 400 of a first embodiment. The machine 400 can be used in either motoring or generating modes and can be used in a number of different power train arrangements (not shown), for example in a hybrid electric vehicle.

The machine 400 has an external stator 410, a pole piece rotor 420 and an internal rotor 430. The stator 410, internal rotor 430 and pole piece rotor 420 are annular in shape and are coaxially mounted such that the stator 410 forms a ring around the pole piece rotor 420, and the pole piece rotor 420 forms a ring around the internal rotor 430. Each of these will now be described in turn.

The stator 410 is similar to a conventional electrical machine stator. The stator is formed from laminations of electrical steel, the laminations being in a plane perpendicular to the axis of the machine 400. The stator 410 is shaped so as to have a radially outer annual body 412 from which project radially inwardly nine teeth 414. The teeth 414 are evenly spaced around the body 412 with space between adjacent teeth 414 for receiving a coil 440 of a winding. A respective coil 440 is provided around each core 414. Each core 414 includes a pole shoe 416 at its radially innermost end. Each pole shoe 416 is shaped to project circumferentially towards each of the two adjacent pole shoes 416 and so as to leave a gap there between. For this embodiment, the windings are three phase 120 degree electrically displaced windings, although other winding configurations are possible. The stator 410 also carries a first set of permanent magnets 450 arranged around the radially innermost surface of the pole shoes 416. The permanent magnets are arranged around the radially inner circumference of the stator 410 such that a radial magnetic field with 18 pole pairs is created in an air gap between the pole piece rotor 420 and the stator 410.

The pole piece rotor 420 is formed from a non-magnetic and non-conductive annular shaped retaining structure 421. The retaining structure 421 is shaped so as to have a number of slots which extend through the body of the retaining structure 421 in a direction parallel to the axis of the machine 400. The slots are evenly spaced around the circumference of the retaining structure 421. Each slot is arranged to retain a pole piece 422 of ferromagnetic material, such as electrical steel. In this embodiment, the retaining structure 421 has 21 slots spaced evenly around the circumference of the retaining structure 42. Accordingly, the retaining structure 421 retains 21 pole pieces.

The internal rotor 430 has six permanent magnets arranged around the radially outermost surface. The permanent magnets are arranged such that the polarity of adjacent magnets alternate around the circumference of the internal rotor 430. The permanent magnets set up a radial magnetic field with 3 pole pairs in the air gap between the internal rotor 430 and the pole piece rotor 420.

Figure 5A:
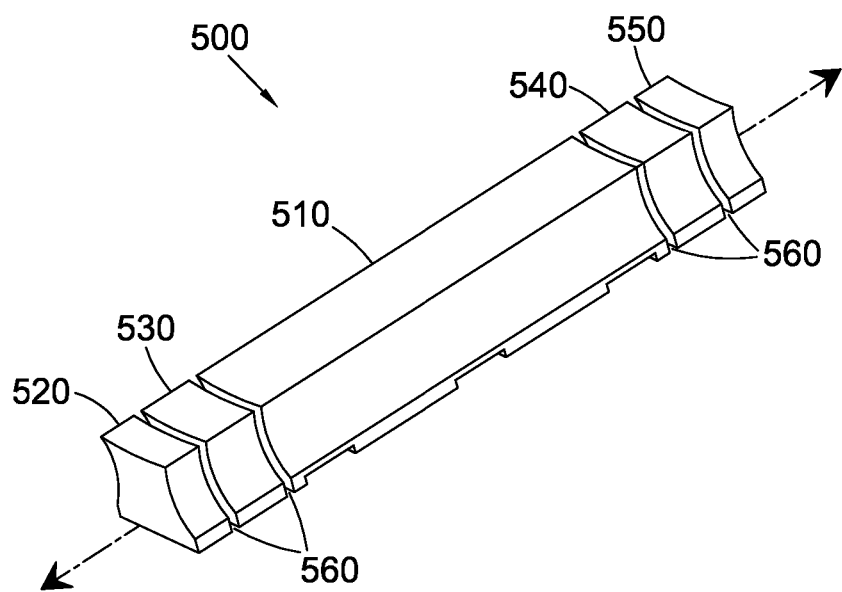
FIG. 5a is a perspective view of a pole piece of the machine of FIG. 4.

FIG. 5a shows an individual one 500 of the pole pieces shown in FIG. 4. Pole piece 500 is for use in the pole piece rotor 420 of the machine 400 of FIG. 4. As in an existing pole piece of this type, the pole piece 500 is arranged to provide a path for radial flux in the machine 400. However, the present pole piece 500 differs from existing pole pieces in additionally reducing the magnetic permeability of the pole piece 500 to axial flux in the machine 400, for example by introducing non-magnetic spaces. In contrast to the radial flux, the axial flux does not contribute to the transmission of torque in the machine 400. Consequently, the axial flux is part of a 'stray' magnetic flux in the machine 400.

The pole piece 500 is made up of a central section 510, two intermediate sections 530, 540 and two outer sections 520, 550. The sections 510, 530, 540, 520, 550 of the pole piece 500 are made from laminations of electrical steel, the laminations being in a plane perpendicular to the axis of the machine 400. The intermediate sections 530, 540 are at either end of the central section 510. The outer sections 520, 550 are at either end of the intermediate sections 530, 540. All sections are separated by air gaps 560. FIG. 5 shows a line 570 that extends from either end of the outer sections 520, 550 in the axial direction and represents the direction of the axial flux in the pole piece 500.

The size and shape of the overall pole piece 500 and the sections 510, 530, 540, 520, 550 will now be described. All references to length are made in reference to components having length in the axial direction of the machine 400. In this embodiment, the pole piece 500 is of approximately the same length as the electrical machine 400. The central section 510 is approximately two thirds of the length of the overall pole piece 500. The combined length of the intermediate sections 530, 540, the outer sections 520, 550 and the air gaps 560 is approximately one third of the length of the overall pole piece 500. The outer sections 520, 550 are approximately half the length of the intermediate sections 530, 540. The air gaps are approximately one quarter of the length of the outer sections 530, 540. The length of the air gaps 560 is small compared to the length of the overall pole piece 500. All sections 520, 530, 540, 550, 560 have generally the same and constant cross section along their axial length. The shape of the cross section is similar to that of a sector taken through an annulus, but with the radially-extending edges of that sector being concave.

Figure 5B:
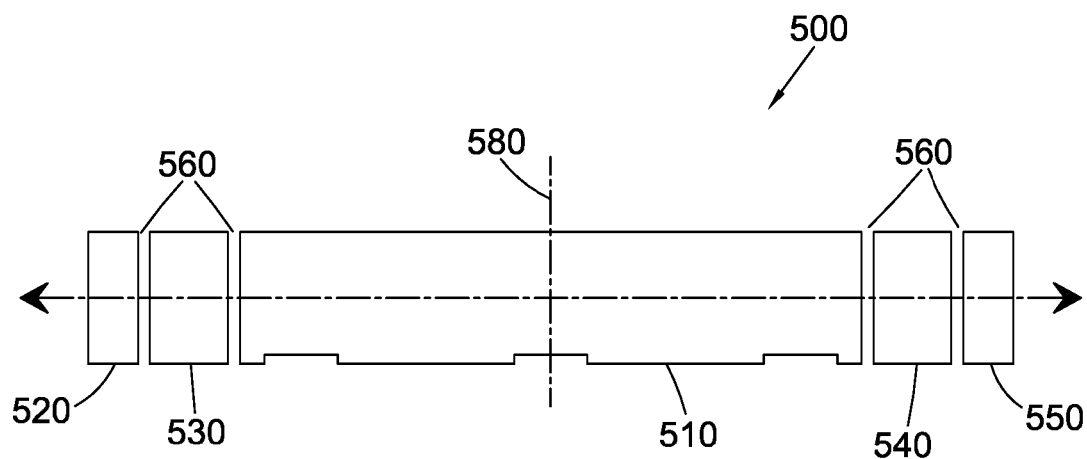

FIG. 5b is a side view of the pole piece 500 of FIG. 5a. The arrangement of the pole piece 500 is such that the pole piece 500 is substantially symmetrical about its midpoint in an axial direction. For completeness, it is noted that FIGS. 5a and 5b include some extra grooves for a different purpose. These are on the bottom surface on FIGS. 5a and 5b but are actually on the outer surface in the machine. They are for a retaining band around the entire pole piece rotor, rather like a hoop on a barrel.

In alternative embodiments, the overall length of the pole piece 500 may be different to the length of the machine 400. In other alternative embodiments, the number and respective lengths of the sections in the pole piece may be different to the arrangement shown in FIGS. 5a and 5b. In other alternative embodiments the number of air gaps (and therefore sections of the pole piece) may be different to the arrangement shown in FIGS. 5a and 5b.

Figure 1:
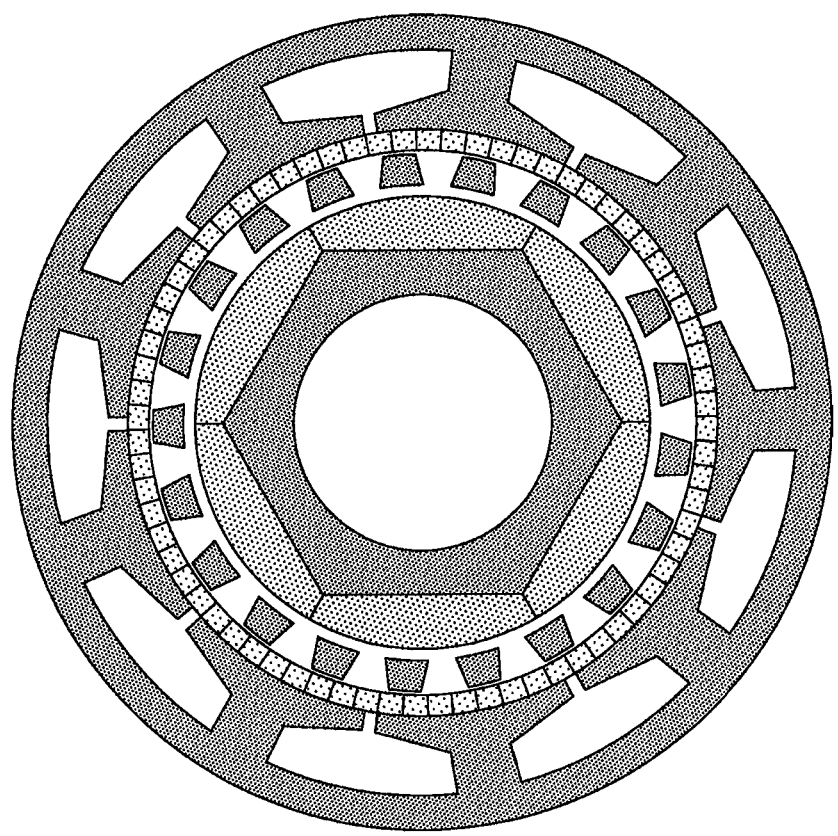
FIG. 1 is an axial view of components of a prior art magnetically geared radial field machine.
Figure 2:
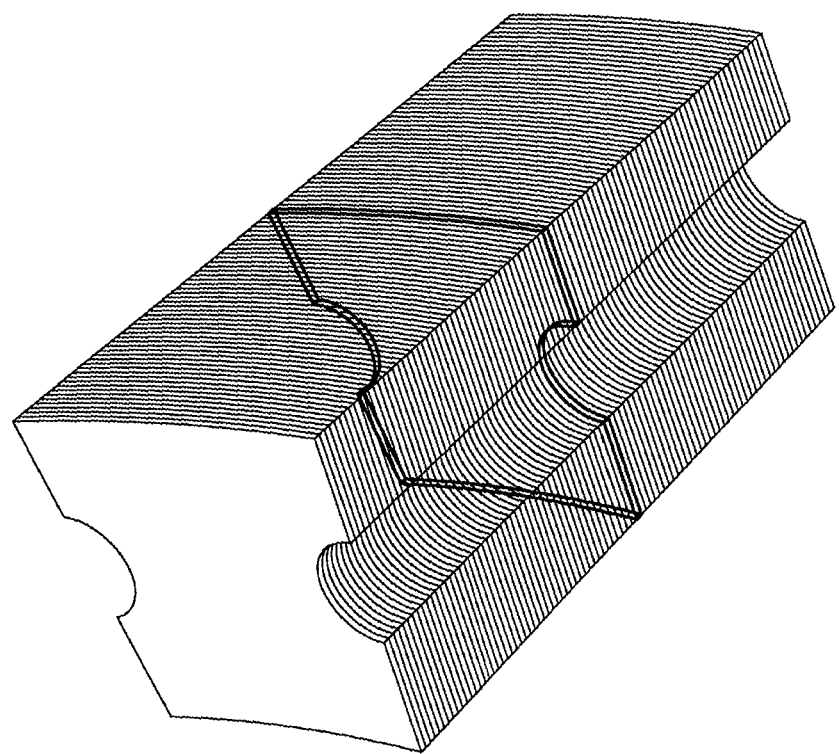
FIG. 2 is a perspective view of a prior art laminated pole piece of the machine of FIG. 1.
Figure 3:
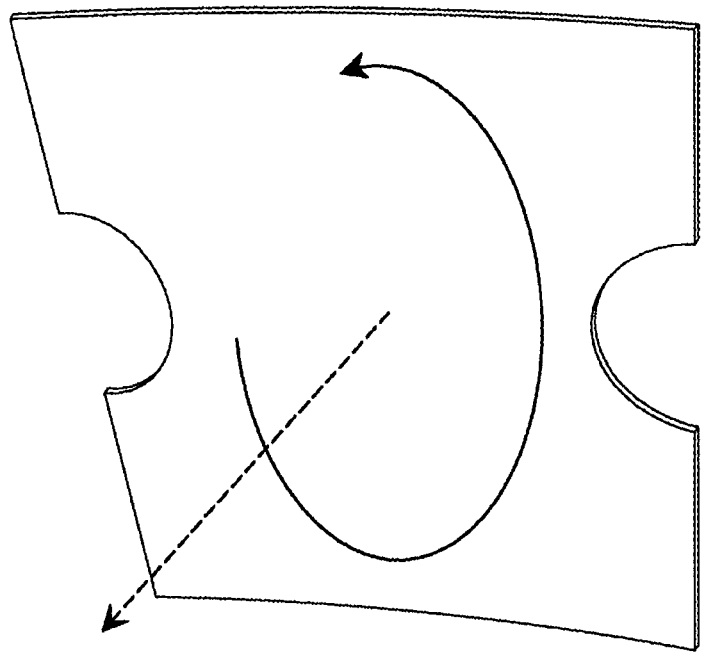
FIG. 3 is a perspective view of a single lamination from the laminated pole piece of FIG. 2.
Figure 6:
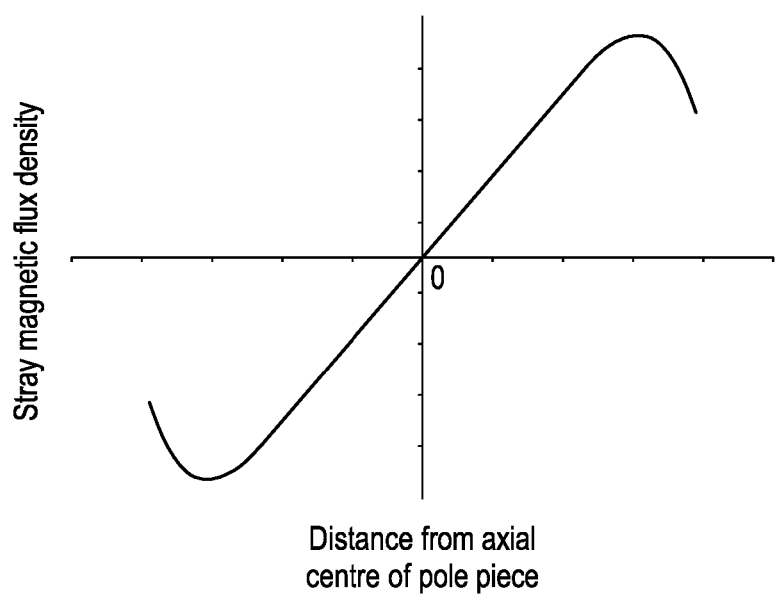
FIG. 6 is a graph illustrating the typical distribution of axial flux along the length of a pole piece in the prior art machine of FIG. 1.

FIG. 6 shows the typical distribution of axial flux along the length of a pole piece in the prior art machine of FIG. 1. The density of the axial magnetic flux increases linearly from the axial centre of the machine, reaching a peak near the axial ends of the pole piece rotor. Since the density of the axial magnetic flux does not tend to be uniformly distributed along the length of the pole piece, it has been realised by the present inventors that it is beneficial to locally impede the axial magnetic field at locations that experience a high density of axial magnetic flux. That is, it has been realised by the present inventors that is beneficial to locally suppress the axial magnetic field near the axial ends of the pole piece.

Accordingly, the air gaps 560 shown in FIGS. 5a and 5b are located near to the axial ends of the pole piece 500. As the magnetic permeability of air is very low, the air gaps 560 suppress the axial magnetic flux in the pole piece 500 by reducing the magnetic permeability of the pole piece 500 in the axial direction at the points in the pole piece 500 where the air gaps 560 are located.

Air gaps 560 are one example of a concentrated flux barrier. A concentrated flux barrier is a region of very high reluctance which is often interposed between two regions of lower reluctance for the purpose of opposing the propagation of magnetic flux between the two regions of lower reluctance. In the context of this disclosure, a concentrated flux barrier is a spacer which replaces at least a portion of the pole piece. A concentrated flux barrier can be made of any non-magnetic material, for example a glass-fibre composite. The number and thickness of concentrated flux barriers depends on the ratio of the machine's axial length to the pole piece rotor diameter. Accordingly, pole pieces of different axial length and radial height may use a different number and arrangement of concentrated flux barriers.

With continued reference to FIGS. 5a and 5b, when the machine 400 is in operation, the air gaps 560 oppose the propagation of axial flux in the pole piece 500. It is likely however that some axial flux will still propagate through the pole piece 500. The axial flux that does propagate through the pole piece 500 will induce eddy currents in the planes of the laminations of the pole piece 500 which lead to a heating effect in the pole piece 500. It may therefore be necessary to actively cool the pole piece 500 to avoid overheating of the machine 500. Such cooling can be achieved by forcing air flow in the air gaps 560. This approach is particularly effective since the air gaps 560 are at the locations of the pole piece 500 experiencing the highest density of axial magnetic flux and where there is the highest energy loss due to heating of the pole piece by the induced eddy currents. Such active cooling is envisaged as an optional feature of embodiments described in this disclosure.

In some embodiments, and with reference to the relationship shown in FIG. 6, it is envisaged that the pole pieces may be shorter in the axial direction than other components in the magnetic circuit, such that the density of the stray magnetic flux over the length of the pole piece is reduced. This approach may be used in combination with or independent from the use of concentrated flux barriers.

Figure 7:
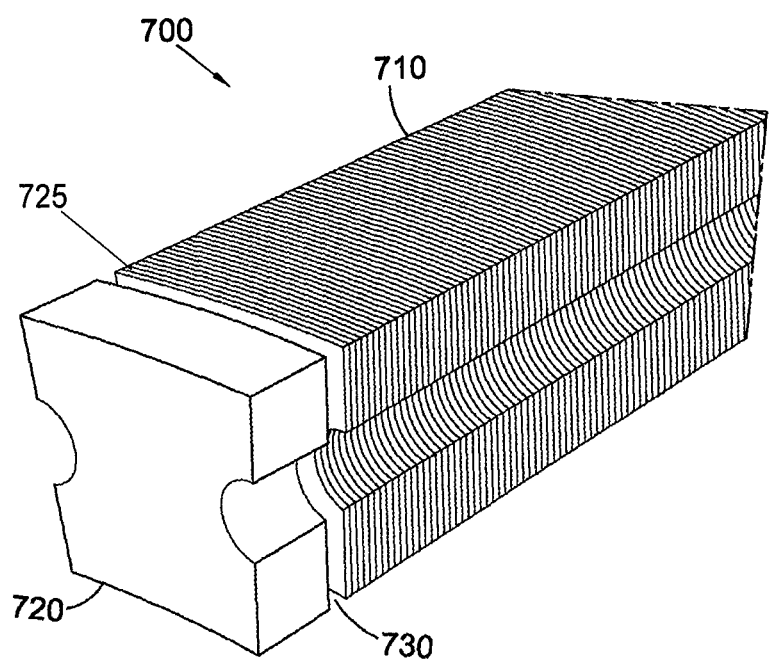
FIG. 7 is a perspective view of an alternative pole piece that may be substituted for that in the machine of FIG. 4 to give a second embodiment.

In a second embodiment, a representative pole piece 700 of which is partly shown in FIG. 7, it is envisaged that any ferromagnetic material be used to make all or part of the pole piece. The pole piece 700 is for use in the machine 400 of FIG. 4 in substitution for the pole piece 500 described above with reference to FIGS. 8a and 8b. The pole piece 700 is generally longer in the axial direction than in the radial direction. Pole piece 700 has a central section 710 made of laminated steel and includes insulating layer 725; two end sections 720 made of a soft magnetic composite, such as powdered iron; and air flux gaps 730 interposed there between. The end sections 720 are at either end of the central section 710. In this embodiment, the pole piece 700 is approximately the same length as the electrical machine 400. The central section 710 is significantly longer in the axial direction than the end sections 720. The air gaps are significantly shorter in the axial direction than the end sections 720. Sections 710 and 720 have generally the same and constant cross sections along their axial length. The sections 710, 720 have generally the same and constant cross section along their axial length. The shape of the cross section is similar to that of a sector taken through an annulus, but with the radially-extending edges having semi-circular arcs projecting inwardly half way up the radially-extending edges, wherein the diameter of the semi-circle is approximately half the radial height of the cross section. The shape of the cross section is such that the pole piece 700 can be supported along its axial length by inserting axial rods in to the concavities created by the inwardly projecting semi-circular arc portions on both sides of the cross section.

With continued reference to FIG. 7, the use of a soft magnetic composite renders the end sections 720 isotropic. In a soft magnetic composite, each granule of the magnetic material in the composite is electrically insulated from every other granule in the composite. This means that in operation, the end sections 720 restrict the flow of eddy currents in all planes of the end sections 720. Beneficially, this reduces the energy loss in the machine 400 caused be the heating of the pole piece 700 by eddy currents. With reference once more to the relationship shown in FIG. 6, it is a further advantage of this embodiment that the end sections are near to the axial ends of the pole piece 400 where the density of the magnetic field is highest and where the induced eddy currents might be highest unless otherwise restricted. Furthermore, it is yet a further advantage of this embodiment that soft magnetic composite has only been used to manufacture the end sections 720 of the pole piece. Advantageously, this means that soft magnetic composite is only being used where it has the greatest effect on energy loss in the machine 400 and without reducing the mechanical strength of the pole piece 700 to the same extent as if the overall pole piece 700 were made entirely from a soft magnetic composite (as mentioned previously with reference to a prior art pole piece). It is yet a further advantage of this embodiment that this embodiment has all of the advantages associated with concentrated flux barriers by way of the air gaps 730.

Figure 8A:
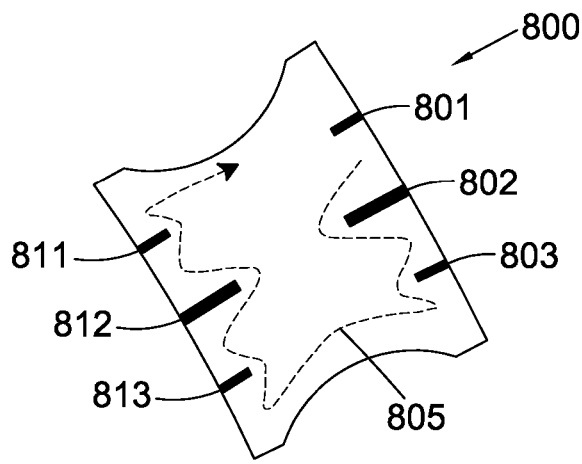
FIG. 8a is an axial view of a single lamination sheet that may be used to form pole pieces in the first or second embodiment.
Figure 8B:
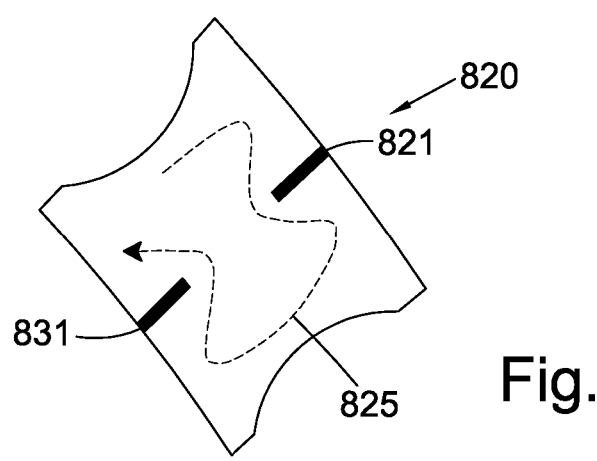
FIG. 8b is an axial view of another single lamination sheet that may be used to form pole pieces in the first or second embodiment.

FIGS. 8a and 8b show axial views of two different single pole piece laminations 800, 820 of which a number of either lamination could be used to make a pole piece for use in the machine 400 of FIG. 4 in substitution for the pole piece 500 described above with reference to FIGS. 5a and 5b. Alternatively, a number of the laminations 800, 820 shown in FIG. 8a or 8b could be used in combination with the features of the pole pieces 500, 700 described above with reference to FIGS. 5a, 5b and FIG. 7 to make a pole piece for use in the machine 400 of FIG. 4 in substitution for the pole piece 500 described above with reference to FIGS. 5a and 5b. The shape of the cross section is similar to that of a sector taken through an annulus, but with the radially-extending edges of that sector being concave.

FIG. 8a shows a lamination 800 of ferromagnetic material, such as electrical steel, with three slits 801, 802, 803 cut in to the radially outer side of the lamination 800 and three slits 811, 812, 813 cut in to the radially inner side of the lamination. The slits 801, 802, 803, 811, 812, 813 extend in to the lamination 800 in the plane of the lamination 800 and in a direction generally perpendicular to the radially inner and outer edges of the lamination 800. The slits 801, 802, 803, 811, 812, 813 are approximately evenly spaced along each of the radially inner and outer edges of the lamination 800 such that there are first 801, 811, second 802, 812, and third 803, 813 slits along each of the radially inner and outer edges of the lamination 800. The first 801, 811 and third 803, 813 slits are arranged either side of the second slits 802, 812. The radial depth of the second slits 802, 812 is approximately one third of the height of the lamination 800 in the radial direction. The radial depth of the first 801, 811 and third 803, 813 slits is approximately one quarter of the height of the lamination 800 in the radial direction. Line 805 in FIG. 8a shows the path of an eddy current induced in the plane of the lamination 800 by axial flux in the lamination 800. The path 805 of the eddy current approximately follows the shape of the lamination 800, including following the shape of the slits 801, 802, 803, 811, 812, 813 in the lamination 800.

FIG. 8b shows a lamination 820 with one slit 821 cut in to the radially outer side of the lamination 820 and one slit 831 cut in to the radially inner side of the lamination 820. The slits 821, 831 are arranged approximately halfway along the radially inner and outer sides of the lamination 820. The slits 821, 831 slits extend in to the lamination 800 in the plane of the lamination 800 and in a direction generally perpendicular to the radially inner and outer edges of the lamination 800. The radial depth 821, 831 of the slits is approximately one third of the height of the lamination 820 in the radial direction. Line 825 in FIG. 8b shows the path of an eddy current induced in the plane of the lamination 820 by axial flux in the plane of the lamination 820. The path 825 of the eddy current approximately follows the shape of the lamination 820, including following the shape of the slits in the lamination 821, 831.

Figure 8C:
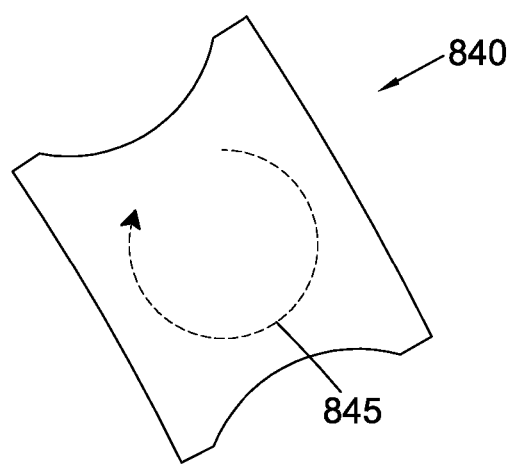
FIG. 8c is an axial view of a single sheet in a prior art laminated pole piece.

For comparison, FIG. 8c shows a single lamination 840 from the pole piece of the prior art machine shown in FIG. 1. The lamination 840 is the same size as the laminations 800, 820 described in reference to FIGS. 8a and 8b. The lamination 840 has no slits. Line 845 in FIG. 8c shows the path of an eddy current induced in the plane of the lamination 840 by axial flux in the plane of the lamination 840. With no slits, the path 845 of the eddy current is approximately circular.

With continued reference to FIGS. 8a, 8b and 8c, the circulating eddy current paths 805, 825 in FIGS. 8a and 8b are longer than the circulating eddy current path 845 of FIG. 8c as the eddy current paths 805, 825 in the laminations 800, 820 of FIGS. 8a and 8b are interrupted by the slits 801, 802, 803, 811, 812, 813, 821, 831 in the laminations 800, 820. Increasing the eddy current path length increases the resistance to the eddy current, resulting in a corresponding decrease in the eddy current. Energy loss due to resistive heating is proportional to current squared with resistance; so the net effect of increasing the eddy current path length is to reduce the energy loss in the lamination due to resistive heating.

In alternative embodiments, the slits as described with reference to FIGS. 8a and 8b may be cut in any direction in the plane of the lamination and extend from any point in the lamination. It will be appreciated that slits do not need to be in contact with the edges of a lamination.

In alternative embodiments, the slits may be thinner than the lamination thickness so as to not compromise the electromagnetic performance of the overall pole piece.

In alternative embodiments, the radial depth of the slits may be up to one third of the pole piece height in the radial direction.

In alternative embodiments, embodiments described in this disclosure may be used in an axial field machine with appropriate modification(s) as would occur to the skilled reader. For example, references to "axial" hereinabove would be modified to "radial" and vice-versa.

In alternative embodiments, embodiments described in this disclosure may be used in a linear field machine with appropriate modification(s) as would occur to the skilled reader.

Where it is possible without apparent technical incompatibility, features of different embodiments disclosed herein may be combined in further embodiments, with some features optionally being omitted.

In alternative embodiments, embodiments described in this disclosure may be used in other types of electrical machines with appropriate modification(s) as would occur to the skilled reader. For example, pole pieces as described herein may be incorporated in a pure magnetic gear as described in GB2472752 or a variable magnetic gear as described in GB2457682.

The invention claimed is:

1. Magnetically geared apparatus comprising a pole piece component, the pole piece component comprising:
   a plurality of pole pieces mounted to a carrier, at least one of the pole pieces comprising two axially-spaced portions spaced apart by a portion of a higher magnetic reluctance than that of each of the two axially-spaced portions, wherein the portion of higher magnetic reluctance is positioned closer to an axial end of the at least one of the pole pieces than to an axial midpoint of the at least one of the pole pieces.

2. Magnetically geared apparatus according to claim 1, wherein one or more of the two axially-spaced portions comprises a plurality of axially-stacked laminations of ferromagnetic material.

3. Magnetically geared apparatus according to claim 1, wherein one or more of the two axially-spaced portions is formed of soft magnetic composite material.

4. Magnetically geared apparatus according to claim 1, wherein there are five axially-spaced portions, an axially central portion of greatest axial length, two axially intermediate portions at either axial end thereof of lesser length, and two axially outer portions each at a respective outer axial end of the intermediate portions, the axially outer portions of least length.

5. Magnetically geared apparatus according to claim 1, wherein the portion of higher reluctance is either an air gap or a portion substantially filled by a solid material of higher reluctance.

6. Magnetically geared apparatus according to claim 1, wherein the at least one pole piece is substantially shorter than an axial length of magnetic-field-generating components of the magnetically geared apparatus.

7. Magnetically geared apparatus comprising a pole piece component, the pole piece component comprising:
a plurality of pole pieces mounted to a carrier, at least one of the pole pieces comprising a plurality of axially-stacked laminations, wherein a periphery of at least one of the axially-stacked laminations in a plane of the at least one of the axially-stacked laminations comprises a slit,
wherein a length by which the slit projects from the periphery of the at least one of the axially-stacked laminations is greater than a width of the slit.

8. Magnetically geared apparatus according to claim 7, wherein a length of the slit in a radial direction is substantially less than a dimension of the at least one of the axially-stacked laminations in the radial direction.

9. Magnetically geared apparatus according to claim 7, wherein a length of the slit is less than one third of a dimension of the at least one of the axially-stacked laminations in a radial direction.

10. Magnetically geared apparatus according to claim 7, wherein the slit extends from a substantially circumferentially-extending edge of the at least one of the axially-stacked laminations.

11. Magnetically geared apparatus according to claim 7, wherein the slit extends from a substantially radially-extending edge of the at least one of the axially-stacked laminations.

12. Magnetically geared apparatus according to claim 7, wherein the slit comprises a first slit which extends from a mid-point of a radially inner edge of the at least one of the axially-stacked laminations, and wherein the at least one of the axially-stacked laminations further comprises a second slit which extends from a mid-point of an outer edge of the at least one of the axially-stacked laminations.

13. Magnetically geared apparatus according to claim 7, wherein the slit is one of three slits which extend from a radially inner edge of the at least one of the axially-stacked laminations, and the at least one of the axially-stacked laminations further comprises three slits which extend from a radially outer edge of the at least one of the axially-stacked laminations.

14. Magnetically geared apparatus comprising a pole piece component, the pole piece component comprising: a plurality of pole pieces mounted to a carrier, at least one of the pole pieces comprising a plurality of axially-stacked laminations, the laminations substantially electrically insulated from each other by the laminations in each pair of juxtaposed laminations being insulated from each other by a respective layer of insulating material, at least one of the layers being at least 10 micrometres in thickness.

15. Magnetically geared apparatus according to claim 1, wherein the axial length of the portion of higher reluctance is shorter than that of any of the axially-spaced portions.

\* \* \* \* \*